US007181723B2

(12) United States Patent
Luk et al.

(10) Patent No.: US 7,181,723 B2
(45) Date of Patent: Feb. 20, 2007

(54) METHODS AND APPARATUS FOR STRIDE PROFILING A SOFTWARE APPLICATION

(75) Inventors: Chi-Keung Luk, Shrewsbury, MA (US); Geoff Lowney, Concord, MA (US)

(73) Assignee: Intel Corporation, Santa Clara, CA (US)

( * ) Notice: Subject to any disclaimer, the term of this patent is extended or adjusted under 35 U.S.C. 154(b) by 259 days.

(21) Appl. No.: 10/446,004

(22) Filed: May 27, 2003

(65) Prior Publication Data

US 2004/0243981 A1 Dec. 2, 2004

(51) Int. Cl.
*G06F 9/45* (2006.01)
(52) U.S. Cl. ...................................... 717/109
(58) Field of Classification Search ............... 717/130, 717/109
See application file for complete search history.

(56) References Cited

U.S. PATENT DOCUMENTS

| | | | |
|---|---|---|---|
| 5,287,487 A | | 2/1994 | Priem et al. |
| 5,444,850 A | | 8/1995 | Chang et al. |
| 5,694,568 A | | 12/1997 | Harrison et al. |
| 6,009,514 A | * | 12/1999 | Henzinger et al. ......... 712/236 |
| 6,047,359 A | | 4/2000 | Fouts et al. |
| 6,047,363 A | * | 4/2000 | Lewchuk ..................... 711/213 |
| 6,076,151 A | * | 6/2000 | Meier ......................... 711/171 |
| 6,098,154 A | * | 8/2000 | Lopez-Aguado et al. ... 711/137 |
| 6,134,643 A | | 10/2000 | Kedem et al. |
| 6,134,710 A | | 10/2000 | Levine et al. |
| 6,430,680 B1 | * | 8/2002 | Burky et al. ................ 712/225 |
| 6,463,535 B1 | | 10/2002 | Drews |
| 6,560,706 B1 | | 5/2003 | Carbajal et al. |
| 6,571,318 B1 | * | 5/2003 | Sander et al. .............. 711/137 |
| 2003/0061497 A1 | | 3/2003 | Zimmer |
| 2003/0084342 A1 | | 5/2003 | Girard |

(Continued)

FOREIGN PATENT DOCUMENTS

WO WO 00/48061 8/2000

(Continued)

OTHER PUBLICATIONS

PCT Internationnal Search Report for application serial No. PCT/US2004/019255, Mar. 3, 2005, 4 pages.

(Continued)

*Primary Examiner*—John Chavis
(74) *Attorney, Agent, or Firm*—Hanley, Flight & Zimmerman, LLC

(57) ABSTRACT

Methods and an apparatus for stride profiling a software application are disclosed. An example system uses a hardware performance counter to report instruction addresses and data addresses associated with memory access instructions triggered by some event, such as a data cache miss. When the same instruction address is associated with more than one data address, the difference between the two data addresses is recorded. When two or more of these data address differences are recorded for the same instruction, the system determines a stride associated with the instruction to be the greatest common divisor of the two or more differences. This stride may be used by a compiler to optimize data cache prefetching. In addition, any overhead associated with monitoring addresses of data cache misses may be reduced by cycling between an inspection phase and a skipping phase. More data cache misses are monitored during the inspection phase than during the skipping phase.

29 Claims, 4 Drawing Sheets

U.S. PATENT DOCUMENTS

| | | | |
|---|---|---|---|
| 2003/0126591 A1* | 7/2003 | Wu et al. | 717/158 |
| 2003/0145314 A1* | 7/2003 | Nguyen et al. | 717/158 |
| 2003/0204840 A1* | 10/2003 | Wu | 717/158 |
| 2004/0123041 A1* | 6/2004 | Krishnaiyer et al. | 711/137 |

OTHER PUBLICATIONS

PCT Written Opinion of the International Searching Authority for application serial No. PCT/US2004/019255, Mar. 3, 2005, 5 pages.

PCT Internationnal Search Report for application serial No. PCT/US2004/014845, May 2, 2005, 4 pages.

PCT Written Opinion of the International Searching Authority for application serial No. PCT/US2004/014845, May 2, 2005, 7 pages.

Wu et al., *Value-Profile Guided Stride Prefetching for Irregular Code, Intel Programming Systems Research Lab, Intel Compiler Lab*, Santa Clara, California, 2002, 16 pages.

Luk et al., *Profile-Guided Post-Link Stride Prefetching, Massachusetts Microprocessor Design Center*, ICS'02, Jun. 22-26, 2002, pp. 167-178.

Barnes et al., *Feedback-Directed Data Cache Optimizations for the x86, Microsoft Research*, Redmond, Virginia, Second ACM Workshop on Feedback-Directed Optimizations, Nov. 1999, 9 pages.

PCT International Preliminary Report on Patentability for Application Serial No. PCT/US2004/014845, Dec. 1, 2005, 1 page.

Written Opinion of the International Searching Authority for Application Serial No. PCT/US2004/014845, Dec. 1, 2005, 7 pages.

PCT Communication pursuant to Article 96(2) EPC, Mar. 7, 2006, 2 page, (considered only the two pages provided).

PCT Communication pursuant to Article 96(2) EPC, Aug. 21, 2006, 5 pages.

* cited by examiner

METHODS AND APPARATUS FOR STRIDE PROFILING A SOFTWARE APPLICATION

TECHNICAL FIELD

The present disclosure pertains to software compilers and, more particularly, to methods and an apparatus for stride profiling a software application.

BACKGROUND

The gap between processor and memory speed continues to widen. As a result, computer performance is increasingly determined by the effectiveness of the cache hierarchy. However, processor workloads typically incur significant cache misses.

Prefetching is a well-known and effective technique for improving the effectiveness of the cache hierarchy. One technique compilers use to improve the accuracy of prefetching is to statistically discover memory access instructions (e.g., load, store, etc.) with a constant "stride." For example, a load instruction that loads every sixteenth byte is easy to prefetch for, because the compiler knows ahead of time what bytes will be needed. However, many memory access instructions with a constant stride cannot be statically discovered by the compiler due to pointer dereferences and indirect array references that are not resolved until run-time.

To address this problem, "instrumentation" code (i.e., test code) may be added to a software application to directly monitor the actual data addresses accessed by one or more memory access instructions. However, instrumentation code adds significant overhead to a software application that slows the application down (e.g., by a factor of 10 times).

DETAILED DESCRIPTION

Generally, the disclosed system uses a hardware performance counter to report instruction addresses and data addresses associated with memory access instructions triggered by some event, such as a data cache miss. When the same instruction address is associated with more than one data address, the difference between the two data addresses is recorded. When two or more of these data address differences are recorded for the same instruction, the system determines a stride associated with the instruction to be the greatest common divisor of the two or more differences. This stride may be used by a compiler to optimize data cache prefetching. In addition, any overhead associated with monitoring addresses of data cache misses may be reduced by cycling between an inspection phase and a skipping phase. More data cache misses are monitored during the inspection phase than during the skipping phase.

Figure 1:
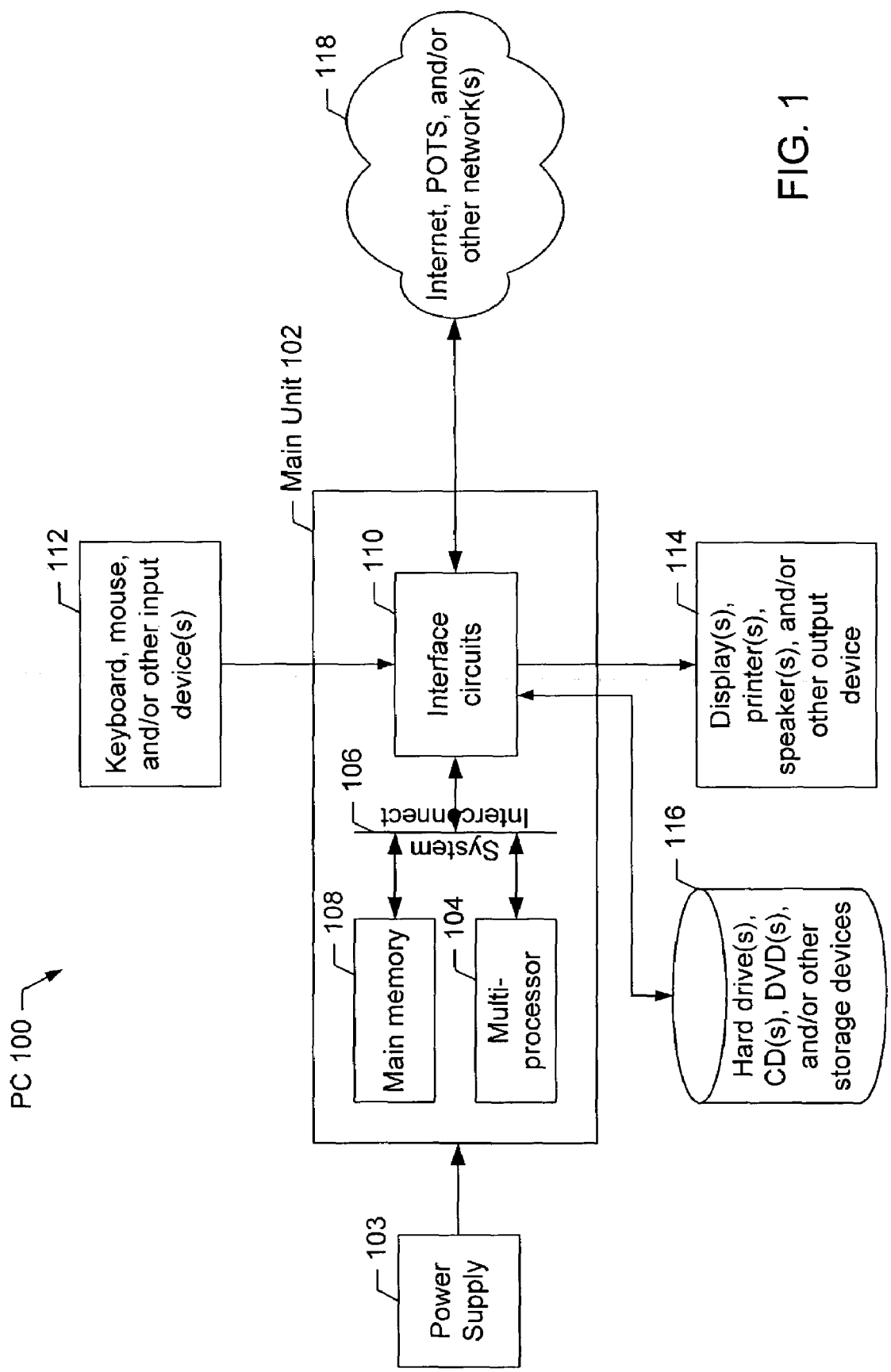
FIG. 1 is a block diagram of an example computer system illustrating an environment of use for the disclosed system.

A block diagram of an example computer system 100 is illustrated in FIG. 1. The computer system 100 may be a personal computer (PC) or any other computing device. In an example, the computer system 100 includes a main processing unit 102 powered by a power supply 103. The main processing unit 102 may include a processor 104 electrically coupled by a system interconnect 106 to a main memory device 108 and to one or more interface circuits 110. In an example, the system interconnect 106 is an address/data bus. Of course, a person of ordinary skill in the art will readily appreciate that interconnects other than busses may be used to connect the processor 104 to the main memory device 108. For example, one or more dedicated lines and/or a crossbar may be used to connect the processor 104 to the main memory device 108.

The processor 104 may be any type of well known processor, such as a processor from the Intel Pentium® family of microprocessors, the Intel Itanium® family of microprocessors, the Intel Centrino® family of microprocessors, and/or the Intel XScale® family of microprocessors. In addition, the processor 104 may include any type of well known cache memory, such as static random access memory (SRAM). The main memory device 108 may include dynamic random access memory (DRAM) and/or any other form of random access memory. For example, the main memory device 108 may include double data rate random access memory (DDRAM). The main memory device 108 may also include non-volatile memory. In an example, the main memory device 108 stores a software program which is executed by the processor 104 in a well known manner.

The interface circuit(s) 110 may be implemented using any type of well known interface standard, such as an Ethernet interface and/or a Universal Serial Bus (USB) interface. One or more input devices 112 may be connected to the interface circuits 110 for entering data and commands into the main processing unit 102. For example, an input device 112 may be a keyboard, mouse, touch screen, track pad, track ball, isopoint, and/or a voice recognition system.

One or more displays, printers, speakers, and/or other output devices 114 may also be connected to the main processing unit 102 via one or more of the interface circuits 110. The display 114 may be a cathode ray tube (CRT), a liquid crystal displays (LCD), or any other type of display. The display 114 may generate visual indications of data generated during operation of the main processing unit 102. The visual indications may include prompts for human operator input, calculated values, detected data, etc.

The computer system 100 may also include one or more storage devices 116. For example, the computer system 100 may include one or more hard drives, a compact disk (CD) drive, a digital versatile disk drive (DVD), and/or other computer media input/output (I/O) devices.

The computer system 100 may also exchange data with other devices via a connection to a network 118. The network connection may be any type of network connection, such as an Ethernet connection, digital subscriber line (DSL), telephone line, coaxial cable, etc. The network 118 may be any type of network, such as the Internet, a telephone network, a cable network, and/or a wireless network.

Figure 2:
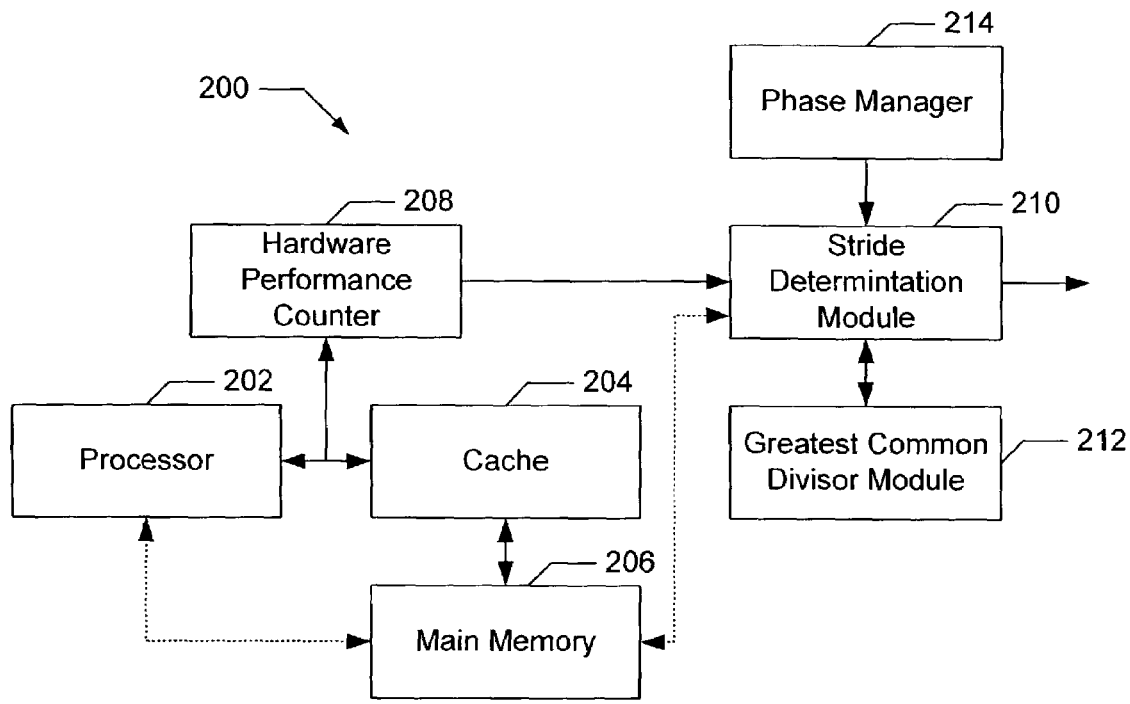
FIG. 2 is a block diagram of another an example computer system illustrating an environment of use for the disclosed system.

Another example computer system 200 is illustrated in FIG. 2. In this example, the computer system 200 includes a processor 202, a cache 204, a main memory 206 a hardware performance counter 208, a stride determination module 210, a greatest common divisor module 212, and a phase manager 214 interconnected as shown.

Again, the processor 202 may be any type of well known processor, such as a processor from the Intel Pentium® family of microprocessors, the Intel Itanium® family of microprocessors, the Intel Centrino® family of microprocessors, and/or the Intel XScale® family of microprocessors. In addition, the processor 202 may include any type of well known cache memory 204, such as static random access memory (SRAM). The main memory device 206 may include dynamic random access memory (DRAM) and/or any other form of random access memory. For example, the main memory device 206 may include double data rate random access memory (DDRAM). The main memory device 206 may also include non-volatile memory. In an example, the main memory device 206 stores a software program which is executed by the processor 202 in a well known manner.

Typically, when the processor 202 encounters an instruction that requires a data value from the main memory 206 (e.g., a load or store instruction), the computer system 200 first checks if the required value is stored in the cache 204. If the required value is stored in the cache 204 (i.e., a cache hit occurs), the required data value need not be retrieved from the main memory 206. However, if the data value is not stored in the cache 204 (i.e., a cache miss occurs), the data value may be retrieved from the main memory 206.

Figure 3:
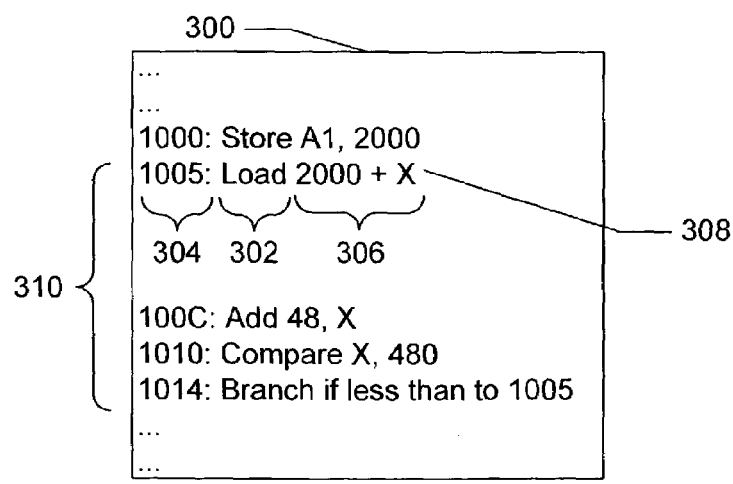
FIG. 3 is an example of a code portion including a load instruction.

In this example, each time a data cache miss occurs, the hardware performance counter 208 captures the address of the instruction that caused the data cache miss (e.g., a load or store instruction) and the address of the required data value. An example of a code portion 300 including a load instruction 302 is illustrated in FIG. 3. In the illustrated example, the load instruction 302 is associated with an instruction address 304 of "1005." Similarly, the load instruction 302 is associated with a data address 306 of "2000+X." The memory location holding the data value retrieved by the processor 202 as a result of executing the load instruction 302 depends on the value of an index variable "X" (308). For example, if X=0, the load instruction causes the data value residing at memory location 2000 to be retrieved. If X=48, the load instruction causes the data value residing at memory location 2048 to be retrieved, etc.

In other words, the memory location holding the load instruction 302 is "1005," and every time this instruction is executed by the processor 202, address "1005" will be associated with the operation. However, the address holding the data value retrieved as a result of the execution of this instruction may vary from one execution of the load instruction 302 to the next execution of the load instruction 302 depending on the value of X. For example, if X is incremented by 48 between each execution of the load instruction 302, the load instruction 302 will load memory location 2000, 2048, 2096, etc. In this example, the load instruction 302 has a stride of 48.

The stride determination module 210 uses instruction addresses and data addresses received from the hardware performance counter 208 to determine the stride (if any) of certain instructions. For example, the load instruction 302 in FIG. 3 has a stride of 48, because X is incremented by 48 each time through a loop 310 that includes the load instruction 302. If the hardware performance counter 208 captured every instruction address and associated data address, the stride determination module 210 could watch for two consecutive occurrences of instruction address 1005 and then subtract the data address of the second occurrence from the data address of the first occurrence in order to determine the stride (e.g., 2048−2000=48).

However, if the hardware performance counter 208 only captures instruction and data addresses when a cache miss occurs, the difference between two consecutive data addresses associated with the same instruction address may be some multiple of the actual stride. For example, the load instruction 302 in FIG. 3 has a stride of 48. However, if only the first occurrence of the load instruction 302 (e.g., data address=2000) and sixth occurrence of the load instruction 302 (e.g., data address=2240) suffer a cache miss, the difference between the data addresses (i.e., 2240−2000) will be 240 (i.e., 48*5) not 48. In this example, the value 240 is a "stride product."

A stride product is a stride value (e.g., 48) multiplied by some stride multiple (e.g., 5) due to occurrences of the instruction that are not reported (e.g., due to data cache hits not being reported by the hardware performance counter 208). A stride product may be determined by subtracting the value of one data address from the value of a previous data address associated with the same instruction address (e.g., 2240−2000=240).

In order to determine the actual stride value from a stride product, the computer system 200 includes a greatest common divisor module 212. The greatest common divisor module 212 takes two or more inputs and determines a greatest common divisor of the inputs in a well known manner. Specifically, the greatest common divisor module 212 takes two or more stride products and determines a stride value. For example, assume that the hardware performance counter 208 reports the same load instruction 302 suffers from a data cache miss three times. Further assume in this example that the data address associated with the first report of the load instruction 302 is 2000, the data address associated with the second report of the load instruction 302 is 2240, and the data address associated with the third report of the load instruction 302 is 2576. The first stride product associated with this example is 240 (i.e., 2240−2000). The second stride product associated with this example is 336 (i.e. 2576−2240). The greatest common divisor of 240 and 336 is 48, and 48 is the actual stride of the load instruction 302 in this example.

Figure 4:
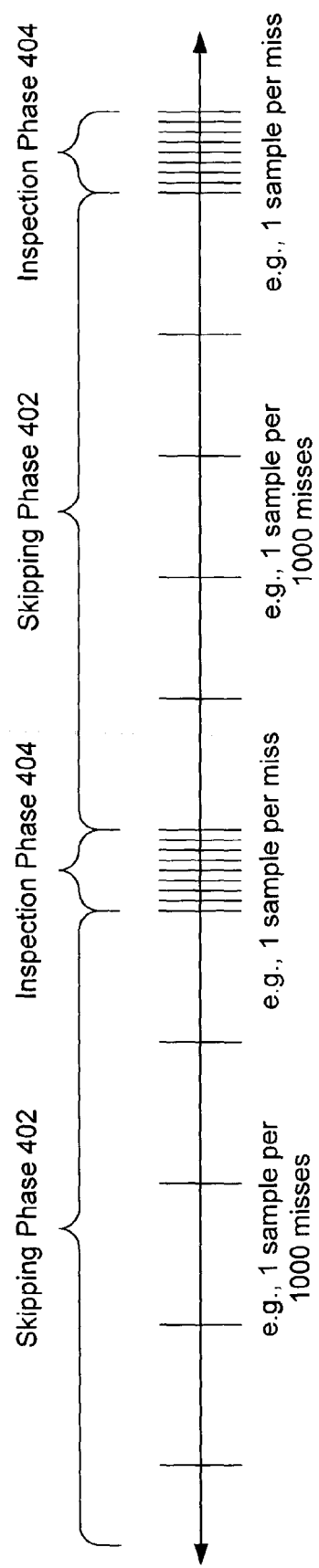
FIG. 4 is an example phase diagram.

In most computing systems 200, determining stride values using cache miss data from the hardware performance counter 208 adds processing overhead to the computer system 200. In order to reduce this overhead, the computer system 200 includes a phase manager 214. The phase manager 214 transitions the stride determination module 210 between two or more phases. An example phase diagram is illustrated in FIG. 4. In this example, the phase manager 214 transitions the stride determination module 210 between a skipping phase 402 and an inspection phase 404. During each instance of the skipping phase 402, the stride determination module 210 processes fewer cache miss reports from the hardware performance counter 208 than are processed during the inspection phase 404. For example, the stride determination module 210 may only sample the hardware performance counter 208 once for every 1000 data cache misses during the skipping phase 402. In contrast, the stride determination module 210 may sample the hardware performance counter 208 every data cache miss during the inspection phase 404.

Figure 5:
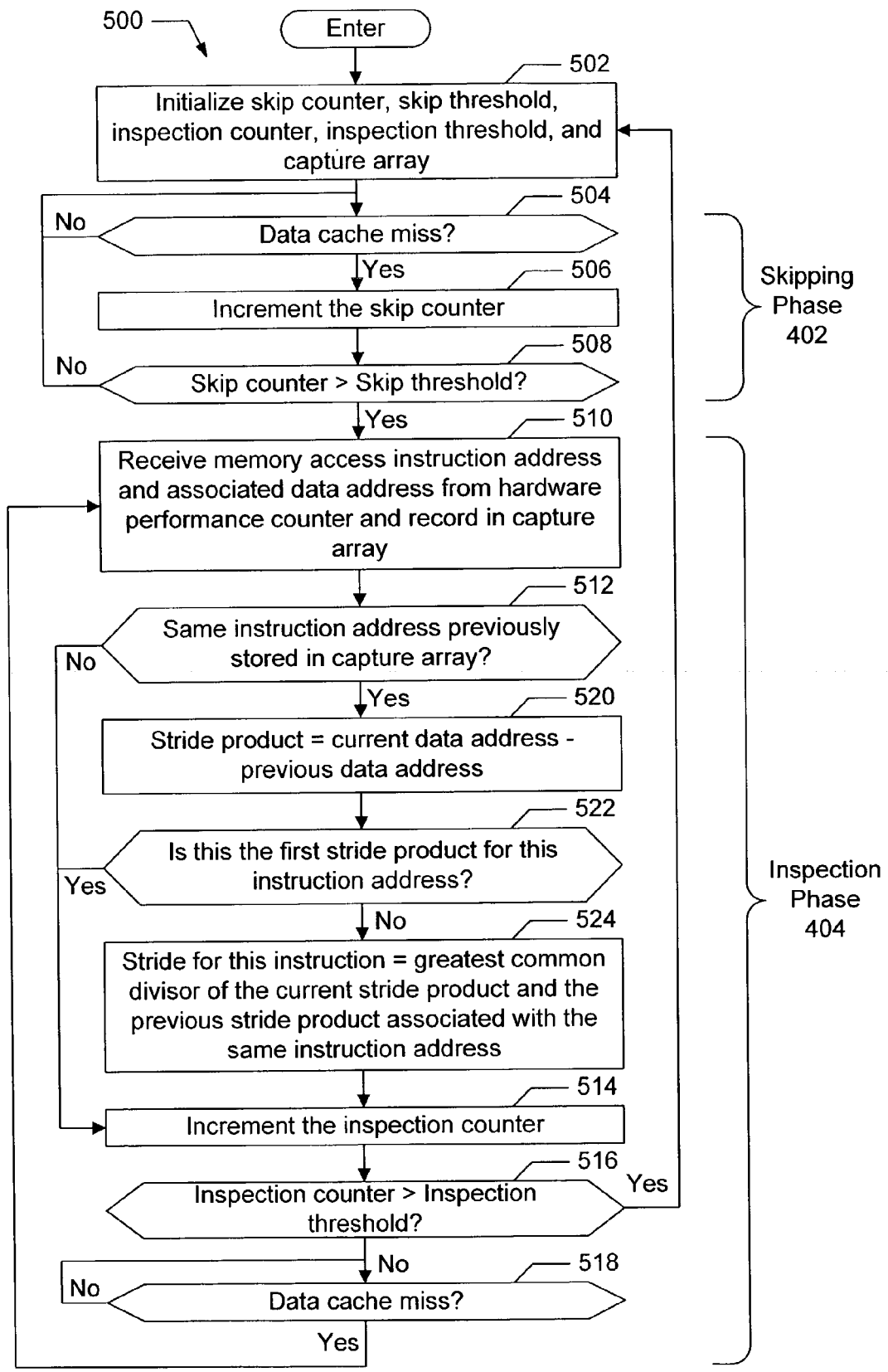
FIG. 5 is a flowchart representative of example machine readable instructions which may be executed by a device to implement an example method of stride profiling a software application.

An example process 500 for stride profiling a software application is illustrated in FIG. 5. Preferably, the process 500 is embodied in one or more software programs which are stored in one or more memories and executed by one or more processors in a well known manner (e.g., processor 104 and/or processor 202). However, some or all of the blocks of the process 500 may be performed manually and/or by some other device. Although the process 500 is described with reference to the flowchart illustrated in FIG. 5, a person of ordinary skill in the art will readily appreciate that many other methods of performing the process 500 may be used. For example, the order of many of the blocks may be altered, the operation of one or more blocks may be changed, blocks may be combined, and/or blocks may be eliminated.

In general, the example process 500 uses a hardware performance counter to report instruction addresses and data addresses associated with memory access instructions triggered by some event, such as a data cache miss. When the same instruction address is associated with more than one data address, the difference between the two data addresses is recorded. When two or more of these data address differences are recorded for the same instruction, the system determines a stride associated with the instruction to be the greatest common divisor of the two or more differences. This stride may be used by a compiler to optimize data cache prefetching. In addition, any overhead associated with monitoring addresses of data cache misses may be reduced by cycling between an inspection phase and a skipping phase. More data cache misses are monitored during the inspection phase than during the skipping phase.

The example process 500 begins by initializing several variables (block 502). Specifically, the example process 500 initializes a skip counter, a skip threshold, an inspection counter, an inspection threshold, and a capture array. Each of these variables may be stored in any memory, such as a main memory 108, 206. The skip counter is used to count the number of data cache (D-cache) misses that occur during a skipping phase, and the skip threshold is used to trigger a change from a skipping phase 402 to an inspection phase 404. The skipping phase 402 is used to reduce the rate at which the hardware performance counter 208 is sampled in order to reduce the overhead associated with the stride profiling being performed. For example, one-thousand D-cache misses may be skipped for each skipping phase 402.

Similarly, the inspection counter is used to count the number of D-cache misses that occur during the inspection phase 404, and the inspection threshold is used to trigger a change from one inspection phase 404 to the next skipping phase 402. The inspection phase 404 is used to increase the rate at which the hardware performance counter 208 is sampled in order to collect data used to perform stride profiling. For example, instruction and data addresses associated with one-thousand consecutive D-cache misses may be collected during each inspection phase 404. The capture array may be used to record the addresses collected during each inspection phase 404.

Once these variables are initialized, the process 500 begins a skipping phase 402 by waiting for a D-cache miss (block 504). In an example, the hardware performance counter 208 is configured to trigger each time a D-cache miss occurs. Because this is the skipping phase 402, the process 500 merely increments the skip counter each time a D-cache miss occurs (block 506). When the number of D-cache misses exceeds the skip threshold, the process 500 proceeds to an inspection phase 404 (block 508).

In the inspection phase 404, an instruction address and the associated data address are received from the hardware performance counter 208 for each D-cache miss (block 510). The instruction address is the address of the instruction that accessed a particular piece of memory. The data address is the address of the particular piece of memory being accessed by the instruction. When a D-cache miss occurs during the inspection phase 404, the process 500 determines if the same instruction address is already recorded in the capture array (block 512). In other words, the process 500 checks if this same instruction has suffered a D-cache miss earlier in this inspection phase 404.

If the same instruction address is not already recorded in the capture array (i.e., this is the first time this particular instruction has suffered a D-cache miss during this inspection phase 404), then the process 500 increments the inspection counter (block 514) and checks if the inspection counter has exceeded the inspection threshold (block 516). If the inspection threshold has not been exceeded (i.e., an inspection phase 404 is still occurring), the process 500 waits for another D-cache miss (block 518). When the next D-cache miss occurs, the process again receives an instruction address and the associated data address from the hardware performance counter 208 (block 510). If this D-cache miss is associated with a different instruction address (block 512), the process 500 increments the inspection counter again (block 514) and checks if the inspection counter has exceeded the inspection threshold again (block 516).

However, if this D-cache miss is associated with an instruction address that has been previously recorded in the capture array (block 512), the process 500 calculates a "stride product" for this instruction address (block 520). A stride product is a stride value multiplied by a stride multiple. For example, if the stride value is 48 bytes and the stride multiple is 5, then the stride product is 240. The stride multiple is a result of D-cache hits. For example, if a particular memory access instruction suffers a D-cache miss, followed by four D-cache hits, followed by another D-cache miss, then the stride multiple is 5. The stride product is determined by subtracting the data address previously recorded in association with this instruction address from the current data address.

The process 500 then determines if the stride product calculated is the first stride product calculated for this instruction address (block 522). For example, if only two cache misses have occurred in association with this instruction address, then only one stride product has been determined (i.e., this is the first stride product). However, if three (or more) cache misses have occurred in association with this instruction address, then more than one stride product may have been determined. For example, the difference between the data address for the first cache miss and the second cache miss may produce a first stride product, and the difference between the data address for the second cache miss and the third cache miss may produce a second stride product.

If the stride product calculated is the first stride product calculated for this instruction address (block 522), the process 500 increments the inspection counter (block 514) and checks if the inspection counter has exceeded the inspection threshold (block 516). If the inspection threshold has not been exceeded (i.e., an inspection phase 404 is still occurring), the process 500 waits for another D-cache miss (block 518).

However, if the stride product calculated is not the first stride product calculated for this instruction address (block 522), the process 500 determines a stride value for this instruction (block 524). Specifically, the stride value is calculated by determining the greatest common divisor of the current stride product associated with this instruction address and the previous stride product associated with the same instruction address. Alternatively, any number of stride products may be used to determine the stride value. For example, the greatest common divisor of three stride products may be used as the stride value.

Subsequently, the process 500 increments the inspection counter (block 514) and checks if the inspection counter has exceeded the inspection threshold (block 516). If the inspection threshold has not been exceeded (i.e., an inspection phase 404 is still occuring), the process 500 waits for another D-cache miss (block 518). However, if the inspection threshold has been exceeded, the process 500 reinitializes certain variables (block 502) returns to a skipping phase 402.

Although the above discloses example systems including, among other components, software executed on hardware, it should be noted that such systems are merely illustrative and should not be considered as limiting. For example, it is contemplated that any or all of the disclosed hardware and software components could be embodied exclusively in dedicated hardware, exclusively in software, exclusively in firmware or in some combination of hardware, firmware and/or software.

In addition, although certain methods, apparatus, and articles of manufacture have been described herein, the scope of coverage of this patent is not limited thereto. On the contrary, this patent covers all apparatuses, methods and articles of manufacture fairly falling within the scope of the appended claims either literally or under the doctrine of equivalents.

What is claimed is:

1. A method of stride profiling a software application, the method comprising: receiving data indicative of a first instruction address and a first data address from a hardware performance counter; receiving data indicative of a second instruction address and a second data address from the hardware performance counter; determining a first stride product by subtracting the first data address from the second data address if the first instruction address is equal to the second instruction address; and determining a stride based on the first stride product.

2. A method as defined in claim 1, wherein determining the stride based on the first stride product comprises determining the stride to be equal to the first stride product.

3. A method as defined in claim 1, further comprising: receiving data indicative of a third instruction address and a third data address from the hardware performance counter; determining a second stride product by subtracting the second data address from the third data address if the second instruction address is equal to the third instruction address.

4. A method as defined in claim 3, wherein determining the stride based on the first stride product comprises determining a greatest common divisor of the first stride product and the second stride product.

5. A method as defined in claim 3, wherein receiving data indicative of a first instruction address and a first data address from a hardware performance counter comprises receiving the first instruction address and the first data address as part of a first data set indicative of a first plurality of consecutive data cache misses.

6. A method as defined in claim 5, further comprising: receiving the first data set indicative of the first plurality of consecutive data cache misses; and receiving a second data set indicative of a second plurality of consecutive data cache misses, wherein receiving the first data set and receiving the second data set is separated by a predetermined period during which data indicative of consecutive data cache misses is not received.

7. A method as defined in claim 1, further comprising: receiving data indicative of a third instruction address and a third data address from the hardware performance counter; receiving data indicative of a fourth instruction address and a fourth data address from the hardware performance counter; determining a second stride product by subtracting the third data address from the fourth data address if the first instruction address is equal to the third instruction address and the fourth instruction address.

8. A method as defined in claim 7, wherein determining the stride based on the first stride product comprises determining a greatest common divisor of the first stride product and the second stride product.

9. A method as defined in claim 1, wherein receiving data indicative of a first instruction address and a first data address from a hardware performance counter comprises receiving the first instruction address and the first data address as part of a data set indicative of a plurality of consecutive data cache misses.

10. A method as defined in claim 1, further comprising sampling the hardware performance counter in a series of periodic bursts.

11. An apparatus for profiling a software application, the apparatus comprising: a processor to execute the software application and a profiling tool; a hardware performance counter operatively coupled to the processor, the hardware performance counter to provide data to the profiling tool, the data being indicative of a first instruction address, a first data address associated with the first instruction address, a second instruction address, and a second data address associated with the second instruction address, wherein the profiling tool determines a stride based on the difference between the first data address and the second data address if the first instruction address is equal to the second instruction address.

12. An apparatus as defined in claim 11, wherein: the data provided to the profiling tool by hardware performance counter further includes a third instruction address and a third data address associated with the third instruction address, the profiling tool determines a first stride product by subtracting the first data address from the second data address if the first instruction address is equal to the second instruction address, the profiling tool determines a second stride product by subtracting the second data address from the third data address if the second instruction address is equal to the third instruction address, and the profiling tool determines the stride based on the first stride product and the second stride product.

13. An apparatus as defined in claim 12, wherein the profiling tool determines the stride by determining a greatest common divisor of the first stride product and the second stride product.

14. An apparatus as defined in claim 11, wherein the hardware performance counter provides the data indicative of the first instruction address and the first data address to the profiling tool when a first data cache miss occurs during execution of the software application.

15. An apparatus as defined in claim 14, wherein the hardware performance counter provides the data indicative of the second instruction address and the second data address to the profiling tool when a second data cache miss occurs during execution of the software application.

16. An apparatus as defined in claim 15, wherein the first data cache miss and the second data cache miss are consecutive data cache misses associated with the first instruction address.

17. An apparatus as defined in claim 11, wherein the profiling tool samples the hardware performance counter in a series of periodic bursts.

18. An apparatus for profiling a software application, the apparatus comprising: a hardware performance counter; a stride determination module operatively coupled to the hardware performance counter; and a greatest common divisor module operatively coupled to a phase manager.

19. An apparatus as defined in claim 18, wherein the hardware performance counter is structured to capture data indicative of an instruction address associated with a data cache miss and a data address associated with a data cache miss.

20. An apparatus as defined in claim 18, wherein the stride determination module is structured to subtract a first data address from a second data address if a first instruction address is equal to a second instruction address.

21. An apparatus as defined in claim 18, further comprising a phase manager operatively coupled to the stride determination module.

22. An apparatus as defined in claim 21, wherein the phase manager is structured to cause a first transition from a first skipping phase to an inspection phase.

23. An apparatus as defined in claim 22, wherein the phase manager is structured to cause a second transition from the inspection phase to a second skipping phase.

24. An apparatus as defined in claim 18, wherein the greatest common divisor module is structured to determine a greatest common divisor of a first stride product and a second stride product.

25. A machine readable medium structured to cause a machine to:

receive first data from a hardware performance counter, the first data being indicative of a first instruction address, a first data address associated with the first instruction address, a second instruction address, and a second data address associated with the second instruction address;

determine a first stride product by subtracting the first data address from the second data address if the first instruction address is equal to the second instruction address; and generate stride profile data based on the first stride product.

26. A machine readable medium as defined in claim 25 further structured to cause the machine to: compile a program based on the stride profile data.

27. A machine readable medium as defined in claim 25 further structured to cause the machine to: receive second data from the hardware performance counter, the second data being indicative of a third instruction address and a third data address associated with the third instruction address; and determine a second stride product by subtracting the second data address from the third data address if the second instruction address is equal to the third instruction address.

28. A machine readable medium as defined in claim 27 further structured to cause the machine to determine a stride by determining a greatest common divisor of the first stride product and the second stride product.

29. A machine readable medium as defined in claim 25 further structured to cause the machine to sample the hardware performance counter in a series of periodic bursts.

* * * * *